(12) United States Patent
Miyata et al.

(10) Patent No.: US 12,134,153 B2
(45) Date of Patent: Nov. 5, 2024

(54) GAS-SHIELDED ARC WELDING METHOD AND METHOD FOR MANUFACTURING WELDED STRUCTURE

(71) Applicants: Kobe Steel, Ltd., Kobe (JP); JFE Steel Corporation, Chiyoda-ku (JP)

(72) Inventors: Minoru Miyata, Kanagawa (JP); Reiichi Suzuki, Kanagawa (JP); Hiroshi Matsuda, Tokyo (JP); Rinsei Ikeda, Tokyo (JP); Sachiko Suzuki, Tokyo (JP); Satoru Ando, Tokyo (JP)

(73) Assignees: Kobe Steel, Ltd., Kobe (JP); JFE Steel Corporation, Chiyoda-ku (JP)

( * ) Notice: Subject to any disclaimer, the term of this patent is extended or adjusted under 35 U.S.C. 154(b) by 1028 days.

(21) Appl. No.: 16/311,268

(22) PCT Filed: Jun. 19, 2017

(86) PCT No.: PCT/JP2017/022456
§ 371 (c)(1),
(2) Date: Dec. 19, 2018

(87) PCT Pub. No.: WO2017/221865
PCT Pub. Date: Dec. 28, 2017

(65) Prior Publication Data
US 2019/0232417 A1  Aug. 1, 2019

(30) Foreign Application Priority Data
Jun. 20, 2016  (JP) .................... 2016-122072

(51) Int. Cl.
*B23K 9/173* (2006.01)
*B23K 9/025* (2006.01)
(Continued)

(52) U.S. Cl.
CPC .............. *B23K 9/173* (2013.01); *B23K 9/025* (2013.01); *B23K 9/23* (2013.01); *B23K 35/30* (2013.01); *B23K 35/32* (2013.01); *B23K 35/38* (2013.01)

(58) Field of Classification Search
CPC .............. B23K 35/00; B23K 35/0255; B23K 35/0261; B23K 35/0266; B23K 35/30;
(Continued)

(56) References Cited

U.S. PATENT DOCUMENTS 6,428,633 B1 * 8/2002 Kasuya .................. B23K 33/00
148/336
6,940,042 B2 * 9/2005 Hara .................. B23K 35/3053
219/145.22

(Continued)

FOREIGN PATENT DOCUMENTS

CN        1651181 A  *  8/2005
CN        100525989 C     8/2009
(Continued)

OTHER PUBLICATIONS

Extended European Search Report issued on Nov. 18, 2019 in European Patent Application No. 17815333.4, 8 pages.
(Continued)

*Primary Examiner* — Hung D Nguyen
(74) *Attorney, Agent, or Firm* — Oblon, McClelland, Maier & Neustadt, L.L.P.

(57) ABSTRACT

A gas-shielded arc welding method includes welding a steel plate having a tensile strength of 780 MPa or more while feeding a consumable electrode via a welding torch and flowing a shielding gas. The consumable electrode includes, in mass %, C: 0 to 0.20%, Si: 0 to 0.50%, Mn: 0 to 0.50%, Cr: 1.00% to 9.00%, S: 0.0020% to 0.0600%, and Ni: 0 to 0.50%. The shielding gas includes, in vol. %, at least one of (Continued)

$CO_2$ and $O_2$: 1% to 15% in total, with the remainder being Ar and unavoidable impurities. Welding is performed under the condition satisfying the relationship of $1 \leq \{-0.05 \times [CO_2+O_2]\}+[Cr] \leq 8.3$, and [Cr] represents the content of Cr in the consumable electrode, and $[CO_2+O_2]$ represents a total content of at least one of $CO_2$ and $O_2$ in the shielding gas.

20 Claims, 1 Drawing Sheet

(51) Int. Cl.
  *B23K 9/23* (2006.01)
  *B23K 35/30* (2006.01)
  *B23K 35/32* (2006.01)
  *B23K 35/38* (2006.01)

(58) Field of Classification Search
  CPC ............ B23K 35/308; B23K 35/3053; B23K 35/3086; B23K 35/32; B23K 35/38; B23K 9/025; B23K 9/173; B23K 9/23
  See application file for complete search history.

(56) References Cited

U.S. PATENT DOCUMENTS

| | | | |
|---|---|---|---|
| 9,259,806 B2* | 2/2016 | Nakamura | C22C 38/002 |
| 10,112,268 B2* | 10/2018 | Amata | B23K 35/3612 |
| 10,449,637 B2* | 10/2019 | Han | B23K 35/306 |
| 2002/0153364 A1* | 10/2002 | North | B23K 35/3608 |
| | | | 219/137 WM |
| 2003/0116550 A1* | 6/2003 | Lee | B23K 35/3093 |
| | | | 219/145.22 |
| 2004/0232131 A1* | 11/2004 | North | B23K 35/30 |
| | | | 219/145.22 |
| 2006/0255026 A1* | 11/2006 | North | B23K 35/30 |
| | | | 219/137 WM |
| 2007/0193995 A1* | 8/2007 | Kapoor | B23K 35/3026 |
| | | | 219/146.1 |
| 2009/0261085 A1* | 10/2009 | Suzuki | B23K 35/362 |
| | | | 219/137 PS |
| 2011/0062133 A1* | 3/2011 | Inoue | B23K 35/361 |
| | | | 219/145.22 |
| 2011/0171485 A1* | 7/2011 | Kawamoto | B23K 35/38 |
| | | | 428/576 |
| 2015/0117937 A1* | 4/2015 | Nakamura | C22C 38/12 |
| | | | 403/272 |
| 2016/0121433 A1* | 5/2016 | Miyata | C22C 38/48 |
| | | | 219/145.22 |
| 2016/0129532 A1* | 5/2016 | Saruwatari | C22C 38/005 |
| | | | 219/74 |
| 2017/0297148 A1* | 10/2017 | Yamakami | B23K 35/0266 |

FOREIGN PATENT DOCUMENTS

| | | | | |
|---|---|---|---|---|
| EP | 1577045 B1 | * | 9/2013 | ............ B23K 9/173 |
| JP | 08290290 A | * | 11/1996 | |
| JP | 2002-361480 A | | 12/2002 | |
| JP | 2007-296535 A | | 11/2007 | |
| JP | 5163215 B2 | | 3/2013 | |
| JP | 5623413 B2 | | 11/2014 | |
| JP | 2015-6693 A | | 1/2015 | |

OTHER PUBLICATIONS

International Search Report Issued on Jul. 18, 2017 in PCT/JP2017/022456 filed on Jun. 19, 2017.

* cited by examiner

GAS-SHIELDED ARC WELDING METHOD AND METHOD FOR MANUFACTURING WELDED STRUCTURE

CROSS-REFERENCE TO RELATED APPLICATIONS

The present application is the national stage of international application PCT/JP2017/022456, filed on Jun. 19, 2017, and claims the benefit of the filing date of Japanese Appl. No. 2016-122072, filed on Jun. 20, 2016.

TECHNICAL FIELD

The present invention relates to a gas-shielded arc welding method and a method for manufacturing a welded structure.

BACKGROUND ART

In the fields of vehicles, construction machinery, bridges and the like, high strengthening using high-tensile steel plates has been advanced for the purpose of weight reduction. However, the load stress on the welded part increases, but the fatigue strength of the welded part does not increase as compared with that of the smooth base metal, and the fatigue strength is ensured only to the same extent as conventional soft steel, so that the fatigue strength inherent in the high-tensile steel plates cannot be exhibited. Therefore, in order to prevent the occurrence of cracks due to aged deterioration, improvement of the fatigue resistance of the welded part is desired.

Here, the reason why the fatigue strength of the welded part is lower than that of the base metal is mainly attributed to stress concentration at weld toe and tensile residual stress caused by the expansion and contraction due to welding heat, and improvements have been attempted by various means.

For example, Patent Document 1 discloses an iron-based consumable welding material having excellent fatigue strength in a welded joint portion, in which the contents of C and Mn are adjusted to specific ranges and predetermined amounts of S and Si are added.

In addition, Patent Document 2 discloses a technique of reducing the martensite transformation point (Ms point) and reducing the tensile residual stress by containing a large amount of Ni in the flux-cored wire.

Further, Patent Document 3 discloses a flux-cored wire containing a large amount of Mn and Mo added, for the purpose of improving the fatigue property of the welded part of the high-strength steel having a tensile strength exceeding 490 MPa.

CITATION LIST

Patent Documents

Patent Document 1: JP-A-2002-361480
Patent Document 2: JP-A-2007-296535
Patent Document 3: JP-A-2015-6693

SUMMARY OF THE INVENTION

Technical Problems

However, Mn and Si are easily oxidizable components and form slag which is hardly peeled off on surfaces of beads. Here, for welded structures used for vehicles or the like, coating is usually performed, but it is difficult to peel off the slag remaining on the surfaces of the beads, so that coating is applied to the slag. Therefore, there is a problem that rust originated from the peeling site thereof occurs when the slag is peeled off after coating.

In addition, since Ni and Mo are expensive elements, there is a problem that cost increases due to the addition of large amounts of Ni and Mo.

Therefore, an object of the present invention is to provide: a gas-shielded arc welding method by which a high-tensile steel plate, particularly a steel plate having a tensile strength of 780 MPa or more can be welded at low cost, excellent fatigue resistance of the welded part and excellent corrosion resistance (coating property) of the welded part can be achieved; and a method for manufacturing a welded structure.

Solution to Problems

That is, the present invention relates to a gas-shielded arc welding method including welding a steel plate having a tensile strength of 780 MPa or more while feeding a consumable electrode via a welding torch and flowing a shielding gas, wherein:

the consumable electrode includes, in mass % based on a total mass of the consumable electrode,
C: 0 to 0.20%,
Si: 0 to 0.50%,
Mn: 0 to 0.50%,
Cr: 1.00% to 9.00%,
S: 0.0020% to 0.0600%, and
Ni: 0 to 0.50%;
the shielding gas includes, in vol. %,
at least one selected from $CO_2$ and $O_2$: 1% to 15% in total, with the remainder being Ar and unavoidable impurities;
welding is performed under the condition satisfying the following relationship (1).

$$1 \leq \{-0.05 \times [CO_2+O_2]\} + [Cr] \leq 8.3 \quad (1)$$

In the relationship (1), [Cr] represents the content (mass %) of Cr in the consumable electrode, and [$CO_2+O_2$] represents a total content (vol. %) of at least one selected from $CO_2$ and $O_2$ in the shielding gas.

It is preferred that, in the gas-shielded arc welding method, welding is performed under the condition satisfying the following relationship (2).

$$0 \leq 900 \times ([C] + \tfrac{1}{4}[Si] + \tfrac{1}{2}[Mn] + \tfrac{1}{2s}[Cr]) \times (0.8 - [CO_2+O_2]/100) - (TS-50)/3 \quad (2)$$

In the relationship (2), [C], [Si], [Mn] and [Cr] represent the contents (mass %) of C, Si, Mn and Cr, respectively, in the consumable electrode, [$CO_2+O_2$] represents the total content (vol. %) of at least one selected from $CO_2$ and $O_2$ in the shielding gas, and TS represents the tensile strength (MPa) of the steel plate.

In the gas-shielded arc welding method, the consumable electrode may further include, in mass % based on the total mass of the consumable electrode,
at least one selected from the group consisting of
Mo: 0.10% or less,
V: 0.10% or less,
Nb: 0.10% or less, and
Cu: 0.50% or less.

It is preferred that, in the gas-shielded arc welding method, the steel plate has a thickness of 1.0 mm to 3.6 mm, and lap fillet welding in which a plurality of the steel plates are lapped and welded is performed.

The present invention also relates to a method for manufacturing a welded structure, including using the gas-shielded arc welding method,
wherein a flank angle at a weld bead toe of the welded structure is 130° to 150°.

Advantageous Effects of the Invention

According to the gas-shielded arc welding method and the method for manufacturing the welded structure in the present invention, a welded part excellent in fatigue resistance and corrosion resistance (coating property) can be obtained, and welding can be performed at low cost.

DESCRIPTION OF EMBODIMENTS

Embodiments for carrying out the present invention are described in detail below. However, the present invention is not limited to the embodiments described below.

The gas-shielded arc welding method in the present embodiment is a gas-shielded arc welding method including welding a steel plate having a tensile strength of 780 MPa or more while feeding a consumable electrode via a welding torch and flowing a shielding gas, and
the consumable electrode includes, in mass % based on a total mass of the consumable electrode,
C: 0 to 0.20%,
Si: 0 to 0.50%,
Mn: 0 to 0.50%,
Cr: 1.00% to 9.00%,
S: 0.0020% to 0.0600%, and
Ni: 0 to 0.50%;
the shielding gas comprises, in vol. %,
at least one selected from $CO_2$ and $O_2$: 1% to 15% in total, with the remainder being Ar and unavoidable impurities;
welding is performed under the condition satisfying the following relationship (1).

$$1 \leq \{-0.05 \times [CO_2+O_2]\} + [Cr] \leq 8.3 \quad (1)$$

(In the relationship (1), [Cr] represents the content (mass %) of Cr in the consumable electrode, and [$CO_2+O_2$] represents a total content (vol. %) of at least one selected from $CO_2$ and $O_2$ in the shielding gas).

First, the welding apparatus used in the gas-shielded arc welding method in the present embodiment (hereinafter, sometimes simply referred to as a welding method of the present embodiment) is described. The welding apparatus is not particularly limited as long as the welding apparatus can perform gas-shielded arc welding, and the welding apparatus used in conventional gas-shielded arc welding can be used without particular limitation.

Figure 1:
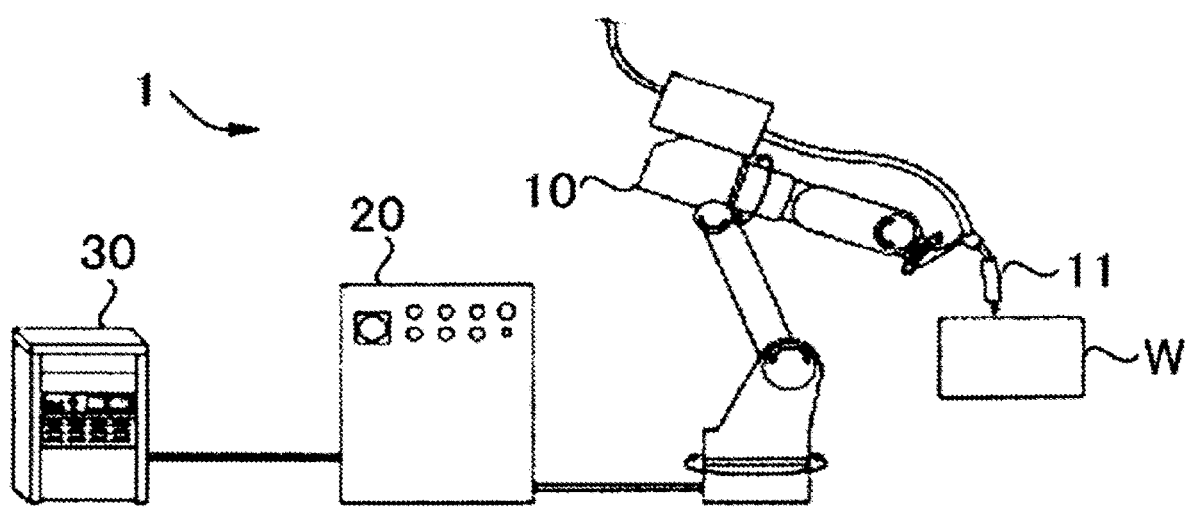
FIG. 1 is an overall configuration diagram showing an example of a welding apparatus used in a gas-shielded arc welding method according to the present invention.

FIG. 1 shows one embodiment of a welding apparatus used in the welding method of the present embodiment. The welding apparatus 1 includes: a robot 10 having a welding torch 11 attached to a tip thereof and allowing the welding torch 11 to move along a welding line of a material to be welded W (hereinafter sometimes referred to as "work" or "base metal"); a wire supply portion (not shown) that supplies a welding wire to the welding torch 11; and a welding power supply portion 30 that supplies current to a consumable electrode via the wire supply portion to generate arc between the consumable electrode and the material to be welded. In addition, the welding apparatus also includes a robot control portion 20 that controls robot operation for moving the welding torch 11.

In the welding method of the present embodiment, a steel plate having a tensile strength of 780 MPa or more is welded while feeding the consumable electrode via the welding torch and flowing a shielding gas.
[Consumable Electrode (Welding Wire)]
A kind of a consumable electrode (welding wire) may be a solid wire which is a steel wire, or may be a flux-cored welding wire composed of a steel sheath having a tubular shape and a flux with which the inner side of the sheath is filled, and the kind is not particularly limited, but the kind of the consumable electrode is preferably a solid wire. In the case of a flux-cored welding wire, the consumable electrode may be in any form of a seamless type having no seam in the sheath or a seam type having a seam on the sheath. In addition, copper plating may or may not be applied to the surface of the welding wire (the outer side of the sheath in the case where the consumable electrode is a flux-cored welding wire).

The reasons for limiting a numerical value of an amount of each component contained in the consumable electrode (welding wire) used in the welding method of the present embodiment are described below. The amount of each component in the following is the content per the total mass of the consumable electrode (welding wire). In addition, in the present description, the percentage based on mass (mass %) is synonymous with the percentage based on weight (wt. %).
(C: 0.20% or Less (Including 0%))
C is an element effective for increasing the strength of the weld metal, but is an element harmful to hot cracking. Therefore, from the viewpoint of preventing hot cracking, the content of C is 0.20% or less, preferably 0.15% or less, more preferably 0.12% or less. On the other hand, from the viewpoint of improving the strength of the weld metal, the content of C is preferably 0.01% or more.
(Si: 0.50% or Less (Including 0%))
Si is an element which reduces the surface tension of the weld metal and improves the bead shape, but Si is a component which is easily oxidized, and is also an element which generates slag hardly peeled off from the surfaces of the beads. Therefore, from the viewpoint of preventing generation of slag and improving the coating property, the content of Si is 0.50% or less, preferably 0.40% or less. On the other hand, Si may not be contained, but in the case of containing Si, the content of Si is preferably 0.01% or more from the viewpoint of the bead shape.
(Mn: 0.50% or Less (Including 0%))
Mn is an element effective for ensuring the hardenability of the weld metal and enhancing the strength of the weld metal, but Mn is a component which is easily oxidized and is also an element which generates slag hardly peeled off from the surfaces of the beads. Therefore, from the viewpoint of preventing generation of slag and improving the coating property, the content of Mn is 0.50% or less, preferably 0.40% or less. On the other hand, Mn may not be contained, but in the case of containing Mn, the content of Mn is preferably 0.01% or more from improving the strength of the weld metal.

(Cr: 1.00% to 9.00%)

Cr is an element effective for increasing the strength of the weld metal, reducing the Ms point to reduce the tensile residual stress, and improving the fatigue resistance of the welded part. In addition, Cr also contributes not only to the improvement of the arc stability during welding but also to improvement of the corrosion resistance of the weld metal. Further, Cr is inexpensive as compared to Ni, Mo, and the like, and is advantageous from the viewpoint of cost. Therefore, from the viewpoint of effectively obtaining these effects, the content of Cr is 1.00% or more, preferably 2.50% or more, more preferably 4.00% or more. On the other hand, when the content of Cr is increased, there is a possibility of hot cracking, so that the content of Cr is set to 9.00% or less. The content of Cr is preferably 7.50% or less, more preferably 6.50% or less.

(S: 0.0020% to 0.0600%)

S is an element which improves the fatigue strength by smoothing the shape of a weld bead toe. Therefore, from the viewpoint of improving the fatigue strength, the content of S is 0.0020% or more, preferably 0.0050% or more, more preferably 0.0200% or more. On the other hand, when the content of S is increased, there is a possibility of hot cracking, so that the content of S is set to 0.0600% or less. The content of S is preferably 0.0500% or less, more preferably 0.0400% or less.

(Ni: 0.50% or Less (Including 0%))

Ni is an element effective for lowering the Ms point, but is very expensive. In addition, when Ni is contained excessively, cracking may occur at the terminal end of the weld metal. Therefore, from the viewpoint of cost reduction and cracking prevention at the terminal end, the content of Ni is 0.50% or less, preferably 0.30% or less, more preferably 0.20% or less. Ni may not be contained, but in the case of containing Ni, the lower limit of the content of Ni is, for example, 0.10%.

In addition, the consumable electrode (welding wire) of the present embodiment may further contain components (optional components) such as Mo, V, and Nb in addition to the above-mentioned components (basic components). The reasons for limiting the numerical value of an amount of each component of these optional components are as follows.

(Mo: 0.10% or Less)

Mo is an element effective for increasing the strength by enhancing the hardenability, but is very expensive. In addition, when Mo is contained excessively, cracking may occur at the terminal end of the weld metal. Therefore, when Mo is added, from the viewpoint of cost reduction and cracking prevention at the terminal end, the content of Mo is 0.10% or less. The content of Mo is preferably 0.05% or less, more preferably 0.02% or less. Mo may not be contained.

(V: 0.10% or Less)

V is an element effective for increasing the strength by enhancing the hardenability, but it is fear that the weld metal is hardened and the toughness is deteriorated to cause cracks due to the precipitation of a carbide when V is contained excessively. Therefore, when V is added, from the viewpoint of cracking prevention, the content of V is 0.10% or less. The content of V is preferably 0.05% or less, more preferably 0.02% or less. V may not be contained.

(Nb: 0.10% or Less)

Nb is an element effective for increasing the strength by enhancing the hardenability, but it is fear that the weld metal is hardened and the toughness is deteriorated to cause cracks due to the precipitation of a carbide when Nb is contained excessively. Therefore, when Nb is added, from the viewpoint of cracking prevention, the content of Nb is 0.10% or less. The content of Nb is preferably 0.05% or less, more preferably 0.02% or less. Nb may not be contained.

(Cu: 0.50% or Less)

Cu is contained in copper plating applied to the wire surface for stabilizing energization from the welding tip to the welding wire. The wire used in the welding method of the present embodiment does not necessarily require copper plating, in the case where the copper plating is applied to the wire surface, it is preferable to set the content of Cu to 0.005% or more and 0.50% or less.

(Remainder)

The basic components and optional components in the consumable electrode (welding wire) used in the welding method of the present embodiment are as described above and the remainder substantially consists of Fe. Here, "substantially consist of Fe" means that inclusion of trace amount of component(s) which does not inhibit properties thereof is permitted besides Fe, and examples of such trace component(s) include unavoidable impurities such as O, N and P. In addition, even with any of the optional components described above, when the content is less than the preferable lower limit of the content thereof, the components may correspond to unavoidable impurities.

[Shielding Gas]

The shielding gas used in the welding method of the present embodiment contains, in vol. %, at least one selected from $CO_2$ and $O_2$ in a total amount of 1% to 15%, and the remainder being Ar and unavoidable impurities. Examples of the unavoidable impurities include $N_2$, $H_2$ and the like, but it is preferable that the shielding gas contains no unavoidable impurities (0 vol. %).

In the present embodiment, the total content of at least one selected from $CO_2$ and $O_2$ (hereinafter also referred to as content of $CO_2+O_2$) in the shielding gas is 1% to 15% (vol. %). When the content of $CO_2+O_2$ is 15% or less, the occurrence of slag can be effectively prevented and the coating property can be improved. The content of $CO_2+O_2$ is preferably 10% or less, more preferably 7% or less. On the other hand, from the viewpoint of arc stability, the content of $CO_2+O_2$ is 1% or more, preferably 2% or more, more preferably 3% or more. Only $CO_2$ may be added, only $O_2$ may be added, or both $CO_2$ and $O_2$ may be added to the shielding gas.

$$[1 \leq \{-0.05 \times [CO_2+O_2]\} + [Cr] \leq 8.3]$$

In addition, in the welding method of the present embodiment, welding is performed under the condition satisfying the following relationship (1). Here, the relationship (1) is a relational expression for estimating the content of Cr remaining in the weld metal in consideration of the influence of the content of $CO_2+O_2$ in the shielding gas. In the following, "$\{-0.05 \times [CO_2+O_2]\} + [Cr]$" may be abbreviated as A in some cases.

$$1 \leq \{-0.05 \times [CO_2+O_2]\} + [Cr] \leq 8.3 \quad (1)$$

(In the relationship (1), [Cr] represents the content (mass %) of Cr in the consumable electrode, $[CO_2+O_2]$ represents the total content (vol. %) of at least one selected from $CO_2$ and $O_2$ in the shielding gas.)

When A is 1 or more, the effect of improving the fatigue resistance of the weld metal is effectively exhibited. A is preferably 2.5 or more, more preferably 4.0 or more. On the other hand, when A is 8.3 or less, occurrence of cracking of the weld metal can be effectively prevented. A is preferably 7.0 or less, more preferably 6.0 or less.

$$[0 \leq 900 \times ([C] + \tfrac{1}{4}[Si] + \tfrac{1}{2}[Mn] + \tfrac{1}{5}[Cr]) \times (0.8 - [CO_2+O_2]/100) - (TS-50)/3]$$

In addition, in the welding method of the present embodiment, welding is performed under the condition satisfying the following relationship (2). Here, the relationship (2) is a relational expression considering the balance between the hardness of the base metal (steel plate) and the hardness of the welded part. In the following, "$900 \times ([C]+\frac{1}{4}[Si]+\frac{1}{2}[Mn]+\frac{1}{25}[Cr]) \times (0.8-[CO_2+O_2]/100)-(TS-50)/3$" may be abbreviated as B in some cases.

$$0 \leq 900 \times ([C]+\frac{1}{4}[Si]+\frac{1}{2}[Mn]+\frac{1}{25}[Cr]) \times (0.8-[CO_2+O_2]/100)-(TS-50)/3 \quad (2)$$

(In the relationship (2), [C], [Si], [Mn] and [Cr] represent contents (mass %) of C, Si, Mn and Cr, respectively, in the consumable electrode, $[CO_2+O_2]$ represents the total content (vol. %) of at least one selected from $CO_2$ and $O_2$ in the shielding gas, and TS represents the tensile strength (MPa) of the steel plate.)

When B is 0 or more, breakage at the interface between the weld metal and the base metal and breakage in the weld metal can be prevented effectively, and such a case is preferable. B is more preferably 15 or more, and still more preferably 30 or more.

[Steel Plate Having Tensile Strength of 780 MPa or More]

As the reason why the residual stress generated in a heat affected zone of the steel material due to the transformation expansion of the weld metal can be reduced, the stress generated on the steel material side when the weld metal expands is the compressive stress due to the reactive force to the weld metal. For this reason, it is expected that the higher the strength steel plate which can expect higher reactive force, the greater the improvement of the fatigue property. When the strength of the steel material is low, the reactive force must also be lowered, and there is a danger of returning to the tensile stress state again due to the thermal contraction after the end of the transformation. If the tensile stress remains, improvement of fatigue strength cannot be expected. Therefore, in the present embodiment, the strength (tensile strength) of the applied base metal is 780 MPa or more as the lower limit at which improvement of fatigue strength can be expected. The limitation of the upper limit of the strength of the base metal is not particularly needed. As the strength of a thin steel plate which is currently in practical use, the maximum strength is about 1500 MPa, and to this extent, it is possible to improve the fatigue strength by the welding method of the present embodiment and overmatching of the weld metal can be achieved in terms of joint tensile strength.

The tensile strength of the steel plate can be determined by the method specified in JIS Z2241.

The thickness of the steel plate is not particularly limited, but in the case of lap fillet welding, it is preferably 1.0 mm to 3.6 mm from the viewpoint of workability of arc welding. Further, from the viewpoint of reducing tensile residual stress after welding, the thickness is more preferably 2.3 mm or more.

[Kind of Welding]

In the welding method of the present embodiment, the kind of welding is not particularly limited, and fillet welding such as lap fillet welding, T-fillet welding, or groove welding such as butt welding can be performed. Particularly, it is preferable to perform fillet welding, particularly lap fillet welding, in which the effect of the welding method of the present embodiment is more desirable.

<Method for Manufacturing Welded Structure>

The method of manufacturing a welded structure according to the present embodiment is a method of manufacturing a welded structure using the gas-shielded arc welding method described above, and a flank angle at the weld bead toe of the welded structure obtained is 130° to 150°.

Figure 2:
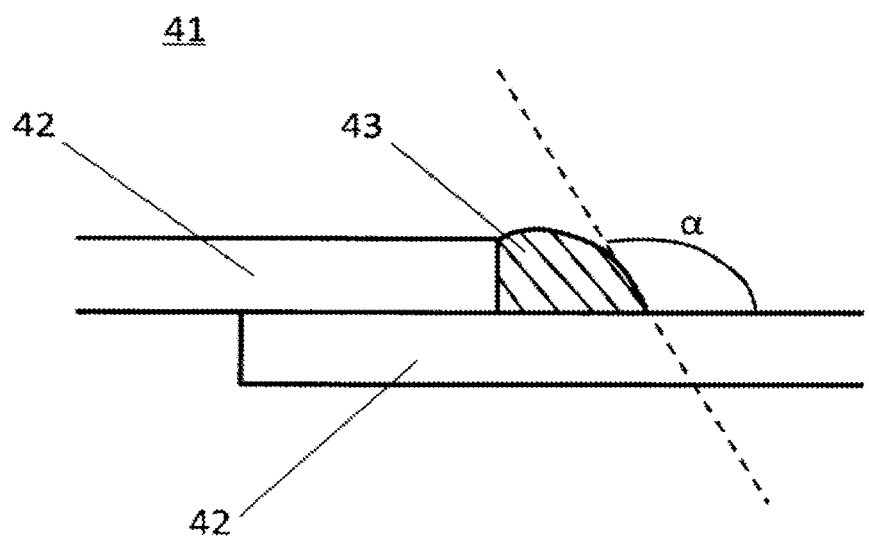
FIG. 2 is a schematic diagram showing an example of a welded structure obtained by the method for manufacturing a welded structure according to the present invention.

FIG. 2 shows a schematic diagram of an example of a welded structure obtained by the method for manufacturing the welded structure of the present embodiment. As shown in FIG. 2, two steel plates 42 are welded to form a welded part 43, and a welded structure 41 is formed. The angle α in the figure is the flank angle at the weld bead toe.

In the present embodiment, the flank angle α at the weld bead toe is preferably in the range of 130° to 150°, more preferably 135° or more from the viewpoint of relaxation of stress concentration.

EXAMPLES

Hereinafter, the present embodiment is more specifically described below by reference to Examples, but the present invention is not limited to these Examples, and the present invention can be carried out by adding changes within the scope conformable to the gist of the present invention, all of which are included in the technical scope of the present invention. Further, the welding condition described here is an example, and in the present embodiment, the welding condition is not limited to the following welding conditions.

The wire having the composition shown in Tables 1 and 2, the shielding gas having the composition shown in Tables 1 and 2, and the steel plates having the tensile strength and thickness shown in Tables 1 and 2 were used, and the lap fillet welding according to No. 1 to No. 31 in Table 1 and No. 32 to No. 42 in Table 2 were performed respectively. No. 1 to No. 31 are Examples, and No. 32 to No. 42 are Comparative Examples.

The extension length of the wire was 15 mm, the width of the lapped portion was 10 mm, and the root gap was 0 mm. The welding speed was 1.0 m/min, the wire diameter was 1.2 mm, the flow rate of the shielding gas was 20 L/min, the torch advancing angle (perpendicular to a welding direction) was absent, and the welding current was 250 A in the case where the thickness was 2.3 mm to 3.6 mm, and was 150 A in the case where the thickness was 1.0 mm to 1.6 mm.

In Tables 1 and 2, the "wire component (mass %)" represents the content (mass %) of each component contained in the consumable electrode (welding wire). Here, "–" represents that the content is equal to or less than the level of unavoidable impurities. In addition, the remainder was substantially Fe.

In addition, in Tables 1 and 2, the "mixing ratio (vol. %)" of the shielding gas represents the content of additive components ($CO_2$, $O_2$) in the shielding gas. In addition, the remainder was Ar and unavoidable impurities.

In addition, the parameters A and B in Tables 1 and 2 are as follows.

$$A = \{-0.05 \times [CO_2+O_2]\} + [Cr]$$

(Here, [Cr] represents the content (mass %) of Cr in the consumable electrode, and $[CO_2+O_2]$ represents the total content (vol. %) of at least one selected from $CO_2$ and $O_2$ in the shielding gas.)

$$B = 900 \times ([C]+\frac{1}{4}[Si]+\frac{1}{2}[Mn]+\frac{1}{25}[Cr]) \times (0.8-[CO_2+O_2]/100)-(TS-50)/3$$

(Here, [C], [Si], [Mn] and [Cr] represent contents (mass %) of C, Si, Mn and Cr, respectively, in the consumable electrode, $[CO_2+O_2]$ represents the total content (vol. %) of at least one selected from $CO_2$ and $O_2$ in the shielding gas, and TS represents the tensile strength (MPa) of the steel plate.)

For each example, evaluation was carried out by the following test. These results are shown in Tables 1 and 2.

(Fatigue Resistance)

Machining was carried out such that weld bead toe on the lower plate side was on the center of the test piece, the test piece was prepared, PBF-30X manufactured by Tokyo Keiki Co., Ltd was used, and a plane bending fatigue test was carried out. The conditions for the plane bending fatigue test were set to 0 for stress ratio and 20 Hz for frequency, and those with a fracture lifetime of 100,000 or more at amplitude stress of 300 MPa were evaluated as "○", and those with less than 100,000 times were evaluated as "x"

(Coating Property)

After completion of the welding, it was processed into a test piece, phosphate treatment was carried out such that the phosphate deposit amount was 2.5 g/m², cation electrodeposition coating was carried out such that a thickness was 30 m, and coating test body was prepared. After the test body was prepared, a corrosion resistance test was carried out in accordance with SAE J2334, the evaluation of "○" indicates that no red rust was formed in the vicinity of the welded part after completion of 48 cycles, and the evaluation of "x" indicates that red rust was generated.

(Joint Fracture Position)

After completion of the welding, it was processed into a rectangular test piece with a width of 40 mm, and a static tensile test of the welded joint was carried out. After the tensile test, the fracture position was visually observed and it was distinguished from weld metal fracture, bond fracture, and base metal fracture (including heat affected zone). The bond fracture refers to fraction along the interface between the weld metal and the base metal.

In addition, the flank angle for the welded structure obtained in each case was measured. The result is shown in Tables 1 and 2.

In addition, for the cases in which cracking occurred in the welded part, the occurrence of cracking is described in the "Others" column of Tables 1 and 2.

TABLE 1

| | Wire Component (mass %) | | | | | | | Shielding Gas | | Steel Plate | |
| | | | | | | | | Addition | Mixing Ratio | Tensile Strength | Thickness |
| No | C | Si | Mn | Cr | Ni | S | Mo | Others | component | (vol. %) | (MPa) | (mm) |
| 1 | 0.08 | 0.33 | 0.35 | 1.07 | — | 0.011 | — | — | $CO_2$ | 1 | 1080 | 2.9 |
| 2 | 0.08 | 0.32 | 0.36 | 3.05 | — | 0.009 | — | — | $CO_2$ | 5 | 1080 | 2.9 |
| 3 | 0.08 | 0.32 | 0.34 | 4.98 | — | 0.010 | — | — | $CO_2$ | 5 | 1080 | 2.9 |
| 4 | 0.08 | 0.34 | 0.35 | 7.08 | — | 0.009 | — | — | $CO_2$ | 5 | 1080 | 2.9 |
| 5 | 0.08 | 0.32 | 0.35 | 8.97 | — | 0.010 | — | — | $CO_2$ | 15 | 1080 | 2.9 |
| 6 | 0.08 | 0.32 | 0.35 | 4.98 | — | 0.010 | — | — | $CO_2$ | 3 | 1080 | 2.9 |
| 7 | 0.08 | 0.32 | 0.35 | 4.98 | — | 0.010 | — | — | $CO_2$ | 10 | 1080 | 2.9 |
| 8 | 0.08 | 0.32 | 0.35 | 4.98 | — | 0.010 | — | — | $CO_2$ | 15 | 1080 | 2.9 |
| 9 | 0.08 | 0.32 | 0.35 | 4.98 | — | 0.010 | — | — | $CO_2$ | 10 | 1080 | 2.9 |
| 10 | 0.08 | 0.32 | 0.35 | 7.08 | — | 0.010 | — | — | $O_2$ | 3 | 1080 | 2.9 |
| 11 | 0.08 | 0.32 | 0.35 | 7.08 | — | 0.010 | — | — | $CO_2$ | 10 | 1080 | 2.9 |
| 12 | 0.08 | 0.32 | 0.35 | 7.08 | — | 0.010 | — | — | $CO_2$ | 15 | 1080 | 2.9 |
| 13 | 0.08 | 0.32 | 0.35 | 7.08 | — | 0.010 | — | — | $O_2$ | 10 | 1080 | 2.9 |
| 14 | 0.08 | 0.32 | 0.35 | 4.98 | — | 0.010 | — | — | $CO_2$ | 5 | 1024 | 3.6 |
| 15 | 0.08 | 0.32 | 0.35 | 4.98 | — | 0.010 | — | — | $CO_2$ | 5 | 1052 | 2.3 |
| 16 | 0.08 | 0.32 | 0.35 | 4.98 | — | 0.010 | — | — | $CO_2$ | 5 | 1047 | 1.6 |
| 17 | 0.08 | 0.32 | 0.35 | 4.98 | — | 0.010 | — | — | $CO_2$ | 5 | 1065 | 1.0 |
| 18 | 0.08 | 0.32 | 0.35 | 4.98 | — | 0.010 | — | — | $CO_2$ | 5 | 821 | 2.9 |
| 19 | 0.08 | 0.32 | 0.35 | 4.98 | — | 0.010 | — | — | $CO_2$ | 5 | 835 | 3.2 |
| 20 | 0.19 | 0.32 | 0.35 | 4.98 | — | 0.012 | — | — | $CO_2$ | 5 | 1080 | 2.9 |

| | Parameters | | Evaluation | | | | |
| No | A | B | Fatigue Property | Coating Property | Joint Fracture Position | Flank Angle | Others |
| 1 | 1.0 | −14 | ○ | ○ | Bond | 138 | |
| 2 | 2.8 | 23 | ○ | ○ | Base Metal | 135 | |
| 3 | 4.7 | 68 | ○ | ○ | Base Metal | 135 | |
| 4 | 6.8 | 135 | ○ | ○ | Base Metal | 138 | |
| 5 | 8.2 | 109 | ○ | ○ | Base Metal | 139 | |
| 6 | 4.8 | 82 | ○ | ○ | Base Metal | 142 | |
| 7 | 4.5 | 44 | ○ | ○ | Base Metal | 133 | |
| 8 | 4.2 | 16 | ○ | ○ | Base Metal | 131 | |
| 9 | 4.5 | 44 | ○ | ○ | Base Metal | 133 | |
| 10 | 6.9 | 141 | ○ | ○ | Base Metal | 142 | |
| 11 | 6.6 | 97 | ○ | ○ | Base Metal | 133 | |
| 12 | 6.3 | 65 | ○ | ○ | Base Metal | 132 | |
| 13 | 6.6 | 97 | ○ | ○ | Base Metal | 133 | |
| 14 | 4.7 | 90 | ○ | ○ | Base Metal | 135 | |
| 15 | 4.7 | 81 | ○ | ○ | Base Metal | 136 | |
| 16 | 4.7 | 82 | ○ | ○ | Base Metal | 135 | |
| 17 | 4.7 | 76 | ○ | ○ | Base Metal | 134 | |
| 18 | 4.7 | 158 | ○ | ○ | Base Metal | 132 | |
| 19 | 4.7 | 153 | ○ | ○ | Base Metal | 135 | |
| 20 | 4.7 | 146 | ○ | ○ | Base Metal | 136 | |

TABLE 1-continued

| | Wire Component (mass %) | | | | | | | Shielding Gas | | Steel Plate | |
| | | | | | | | | Addition | Mixing Ratio | Tensile Strength | Thickness |
| No | C | Si | Mn | Cr | Ni | S | Mo | Others | component | (vol. %) | (MPa) | (mm) |
|---|---|---|---|---|---|---|---|---|---|---|---|---|
| 21 | 0.08 | 0.49 | 0.36 | 4.98 | — | 0.008 | — | — | $CO_2$ | 5 | 1080 | 2.9 |
| 22 | 0.08 | 0.32 | 0.49 | 4.98 | — | 0.009 | — | — | $CO_2$ | 5 | 1080 | 2.9 |
| 23 | 0.08 | 0.36 | 0.33 | 4.98 | — | 0.057 | — | — | $CO_2$ | 5 | 1080 | 2.9 |
| 24 | 0.08 | 0.38 | 0.32 | 4.98 | — | 0.011 | 0.10 | — | $CO_2$ | 5 | 1080 | 2.9 |
| 25 | 0.08 | 0.34 | 0.31 | 4.98 | | 0.012 | — | Nb: 0.10 | $CO_2$ | 5 | 1080 | 2.9 |
| 26 | 0.08 | 0.32 | 0.38 | 4.98 | — | 0.011 | — | V: 0.10 | $CO_2$ | 5 | 1080 | 2.9 |
| 27 | 0.02 | 0.32 | 0.35 | 4.98 | — | 0.009 | — | — | $CO_2$ | 5 | 1080 | 2.9 |
| 28 | 0.08 | 0.10 | 0.35 | 4.98 | — | 0.008 | — | — | $CO_2$ | 5 | 1080 | 2.9 |
| 29 | 0.08 | 0.32 | 0.10 | 4.98 | — | 0.010 | — | — | $CO_2$ | 5 | 1080 | 2.9 |
| 30 | 0.08 | 0.32 | 0.35 | 4.98 | — | 0.003 | — | — | $CO_2$ | 5 | 1080 | 2.9 |
| 31 | 0.03 | 0.25 | 0.25 | 2.95 | — | 0.010 | — | — | $CO_2$ | 10 | 821 | 2.9 |

| | Parameters | | Evaluation | | | | |
| No | A | B | Fatigue Property | Coating Property | Joint Fracture Position | Flank Angle | Others |
|---|---|---|---|---|---|---|---|
| 21 | 4.7 | 132 | ○ | ○ | Base Metal | 136 | |
| 22 | 4.7 | 119 | ○ | ○ | Base Metal | 135 | |
| 23 | 4.7 | 78 | ○ | ○ | Base Metal | 136 | |
| 24 | 4.7 | 81 | ○ | ○ | Base Metal | 133 | |
| 25 | 4.7 | 65 | ○ | ○ | Base Metal | 132 | |
| 26 | 4.7 | 81 | ○ | ○ | Base Metal | 136 | |
| 27 | 4.7 | 31 | ○ | ○ | Base Metal | 132 | |
| 28 | 4.7 | −3 | ○ | ○ | Bond | 136 | |
| 29 | 4.7 | −13 | ○ | ○ | Bond | 135 | |
| 30 | 4.7 | 71 | ○ | ○ | Base Metal | 134 | |
| 31 | 2.5 | −6 | ○ | ○ | Bond | 133 | |

TABLE 2

| | Wire Component (mass %) | | | | | | | | Shielding Gas | | Steel Plate | |
| | | | | | | | | | Addition | Mixing Ratio | Tensile Strength | Thickness |
| No | C | Si | Mn | Cr | Ni | S | Mo | Others | component | (vol. %) | (MPa) | (mm) |
|---|---|---|---|---|---|---|---|---|---|---|---|---|
| 32 | 0.08 | 0.32 | 0.35 | 1.07 | — | 0.010 | — | — | $CO_2$ | 5 | 1080 | 2.9 |
| 33 | 0.08 | 0.35 | 0.32 | 8.98 | — | 0.010 | — | — | $CO_2$ | 5 | 1080 | 2.9 |
| 34 | 0.21 | 0.32 | 0.35 | 4.98 | — | 0.010 | — | — | $CO_2$ | 5 | 1080 | 2.9 |
| 35 | 0.09 | 0.52 | 0.35 | 4.98 | — | 0.010 | — | — | $CO_2$ | 5 | 1080 | 2.9 |
| 36 | 0.08 | 0.32 | 0.53 | 4.98 | — | 0.010 | — | — | $CO_2$ | 5 | 1080 | 2.9 |
| 37 | 0.08 | 0.34 | 0.33 | 0.95 | — | 0.010 | — | — | $CO_2$ | 5 | 1080 | 2.9 |
| 38 | 0.08 | 0.32 | 0.32 | 9.07 | — | 0.010 | — | — | $CO_2$ | 5 | 1080 | 2.9 |
| 39 | 0.08 | 0.33 | 0.35 | 4.98 | — | 0.063 | — | — | $CO_2$ | 5 | 1080 | 2.9 |
| 40 | 0.08 | 0.32 | 0.35 | 4.98 | — | 0.010 | — | — | $CO_2$ | 20 | 1080 | 2.9 |
| 41 | 0.08 | 0.32 | 0.35 | 4.98 | — | 0.010 | — | — | $CO_2$ | 5 | 472 | 2.9 |
| 42 | 0.08 | 0.35 | 0.35 | 4.98 | 0.51 | 0.010 | — | — | $CO_2$ | 5 | 1080 | 2.9 |

| | Parameters | | Evaluation | | | | |
| No | A | B | Fatigue Property | Coating Property | Joint Fracture Position | Flank Angle | Others |
|---|---|---|---|---|---|---|---|
| 32 | 0.8 | −34 | x | ○ | Weld Metal | 129 | |
| 33 | 8.7 | 179 | ○ | ○ | Base Metal | 126 | Cracking |
| 34 | 4.7 | 159 | ○ | ○ | Base Metal | 127 | Cracking |
| 35 | 4.7 | 146 | ○ | x | Base Metal | 122 | |
| 36 | 4.7 | 132 | ○ | x | Base Metal | 136 | |
| 37 | 0.7 | −38 | x | x | Weld Metal | 124 | |
| 38 | 8.8 | 172 | ○ | ○ | Base Metal | 125 | Cracking |
| 39 | 4.7 | 75 | ○ | ○ | Base Metal | 126 | Cracking |
| 40 | 4.0 | −12 | x | x | Weld Metal | 124 | |
| 41 | 4.7 | 274 | x | ○ | Base Metal | 122 | |
| 42 | 4.7 | 81 | ○ | ○ | Base Metal | 135 | Cracking at terminal end |

From the above results, the following can be found.

In No. 32, the fatigue resistance was inferior since A was less than 1.0.

In No. 33, cracking occurred at the welded part since A was larger than 8.3.

In No. 34, cracking occurred at the welded part since the content of C was larger than 0.20%.

In No. 35, the coating property was inferior since the content of Si was more than 0.50%.

In No. 36, the coating property was inferior since the content of Mn was more than 0.50%.

In No. 37, the fatigue resistance and the coating property were inferior since the content of Cr was less than 1.0% and A was less than 1.0.

In No. 38, cracking occurred at the welded part since the content of Cr was more than 9.0% and A was larger than 8.3.

In No. 39, cracking occurred at the welded part since the content of S was larger than 0.0600%.

In No. 40, the fatigue resistance and the coating property were inferior since the content of $CO_2+O_2$ in the shielding gas was more than 15%.

In No. 41, the fatigue resistance was inferior since the tensile strength of the steel plate was less than 780 MPa.

In No. 42, cracking occurred at the terminal end since the content of Ni was larger than 0.50%.

On the other hand, since No. 1 to No. 31 satisfy the requirements of the present invention, these were excellent in fatigue resistance and coating property, and occurrence of cracking was not confirmed.

While the present invention has been described in detail and with reference to specific embodiments thereof, it will be apparent to one skilled in the art that various changes and modifications can be made therein without departing from the spirit and scope thereof.

This application is based on Japanese Patent Application No. 2016-122702 filed on Jun. 20, 2016, the entire subject matters of which are incorporated herein by reference.

DESCRIPTION OF REFERENCE NUMERALS

1 Welding apparatus
10 Robot
11 Welding torch
20 Robot control portion
30 Welding power supply portion
41 Welded structure
42 Steel plate
43 Welded part
α Flank angle at weld bead toe

The invention claimed is:

1. A gas-shielded arc welding method, comprising:
welding a steel plate having a tensile strength of 780 MPa or more while feeding a consumable electrode via a welding torch and flowing a shielding gas,
wherein the consumable electrode comprises Fe and, in mass % based on a total mass of the consumable electrode,
C in a range of from 0 to 0.20%,
Si in a range of from 0 to 0.50%,
Mn in a range of from 0 to 0.50%,
Cr in a range of from 3.05 to 7.50%,
S in a range of from 0.0020 to 0.0600%, and
Ni in a range of from 0 to 0.30%;
wherein the shielding gas comprises Ar and, in vol. %, at least one selected from $CO_2$ and $O_2$: 1% to 15% in total, and
wherein the welding is performed under conditions satisfying the following relationship (1)

$$3 \leq \{-0.05 \times [CO_2+O_2]\} + [Cr] \leq 7.0 \quad (1),$$

wherein [Cr] represents a content, in mass %, of Cr in the consumable electrode, and
$[CO_2+O_2]$ represents a total content, in vol. %, of at least one selected from $CO_2$ and $O_2$ in the shielding gas.

2. The method of claim 1, wherein the welding is performed under conditions satisfying the following relationship (2):

$$0 \leq 900 \times ([C]+\tfrac{1}{4}[Si]+\tfrac{1}{2}[Mn]+\tfrac{1}{25}[Cr]) \times (0.8-[CO_2+O_2]/100)-(TS-50)/3 \quad (2),$$

wherein [C], [Si], [Mn], and [Cr] represent contents, in mass %, of C, Si, Mn, and Cr, respectively, in the consumable electrode,
$[CO_2+O_2]$ represents the total content, in vol. %, of at least one selected from the group consisting of $CO_2$ and $O_2$ in the shielding gas, and
TS represents a tensile strength, in MPA, of the steel plate.

3. The method of claim 1, wherein the consumable electrode further comprises, in mass % based on the total mass of the consumable electrode,
Mo in 0.10% or less,
V in 0.10% or less,
Nb in 0.10% or less, and/or
Cu in 0.50% or less.

4. The method of claim 1, wherein the welding comprises lap fillet welding performed by lapping and welding a plurality of the steel plates each having a thickness in a range of from 1.0 to 3.6 mm.

5. The method of claim 1, wherein the consumable electrode further comprises, based on the total consumable electrode mass, Mo in 0.10 mass % or less.

6. The method of claim 1, wherein the consumable electrode further comprises, based on the total consumable electrode mass, V in 0.10% or less.

7. The method of claim 1, wherein the consumable electrode further comprises, based on the total consumable electrode mass, Nb in 0.10% or less.

8. The method of claim 1, wherein the consumable electrode further comprises, based on the total consumable electrode mass, Cu in 0.50% or less.

9. The method of claim 1, wherein the consumable electrode further comprises, based on the total consumable electrode mass, Mo in a range of from more than 0 to less than 0.10 mass %.

10. The method of claim 1, wherein the consumable electrode further comprises, based on the total consumable electrode mass, V in a range of from more than 0 to less than 0.10 mass %.

11. The method of claim 1, wherein the consumable electrode further comprises, based on the total consumable electrode mass, Nb in a range of from more than 0 to less than 0.10 mass %.

12. The method of claim 1, wherein the consumable electrode further comprises, based on the total consumable electrode mass, Cu in a range of from more than 0 to less than 0.50 mass %.

13. The method of claim 1, wherein the consumable electrode comprises the Mn in a range of from 0 to 0.10 mass %.

14. The method of claim 1, wherein the consumable electrode comprises the C in a range of from 0 to 0.08 mass %.

15. A method for manufacturing a welded structure, the method comprising:

welding a steel plate having a tensile strength of 780 MPa or more while feeding a consumable electrode via a welding torch and flowing a shielding gas, wherein the consumable electrode comprises Fe and, in mass % based on a total consumable electrode mass, C in a range of from 0 to 0.20%,
Si in a range of from 0 to 0.50%,
Mn in a range of from 0 to 0.50%,
Cr in a range of from 3.05 to 7.50%,
S in a range of from 0.0020 to 0.0600%, and
Ni in a range of from 0 to 0.30%, wherein the shielding gas comprises Ar and, in a range of from 1 to 15 vol. % in total, $CO_2$ and/or $O_2$, wherein the welding is performed under conditions satisfying relationship (1)

$$3 \leq \{-0.05 \times [CO_2+O_2]\} + [Cr] \leq 7.0 \quad (1),$$

wherein

[Cr] is a content, in mass %, of the Cr in the consumable electrode, and $[CO_2+O_2]$ is a total content, in vol. %, of the $CO_2$ and/or $O_2$ in the shielding gas, and wherein a flank angle at a weld bead toe of the welded structure is in a range of from 130° to 150°.

16. The method of claim 15, wherein the welding is performed under conditions satisfying relationship (2):

$$0 \leq 900 \times ([C] + \tfrac{1}{4}[Si] + \tfrac{1}{2}[Mn] + \tfrac{1}{25}[Cr]) \times (0.8 - [CO_2+O_2]/100) - (TS-50)/3 \quad (2),$$

wherein

[C], [Si], [Mn], and [Cr] are respective contents, in mass %, of C, Si, Mn, and Cr, in the consumable electrode, $[CO_2+O_2]$ is the total content, in vol. %, of the $CO_2$ and/or $O_2$ in the shielding gas, and TS is a tensile strength, in MPA, of the steel plate.

17. The method of claim 15, wherein the consumable electrode further comprises, in mass % based on the total consumable electrode mass, Mo in 0.10% or less,
V in 0.10% or less,
Nb in 0.10% or less, and/or
Cu in 0.50% or less.

18. The method of claim 15, wherein the welding comprises lap fillet welding performed by lapping and welding a plurality of the steel plates each having a thickness in a range of from 1.0 to 3.6 mm.

19. The method of claim 15, wherein the consumable electrode further comprises, based on the total consumable electrode mass, V in 0.10% or less.

20. The method of claim 15, wherein the consumable electrode further comprises no V.

* * * * *